Patented July 29, 1947

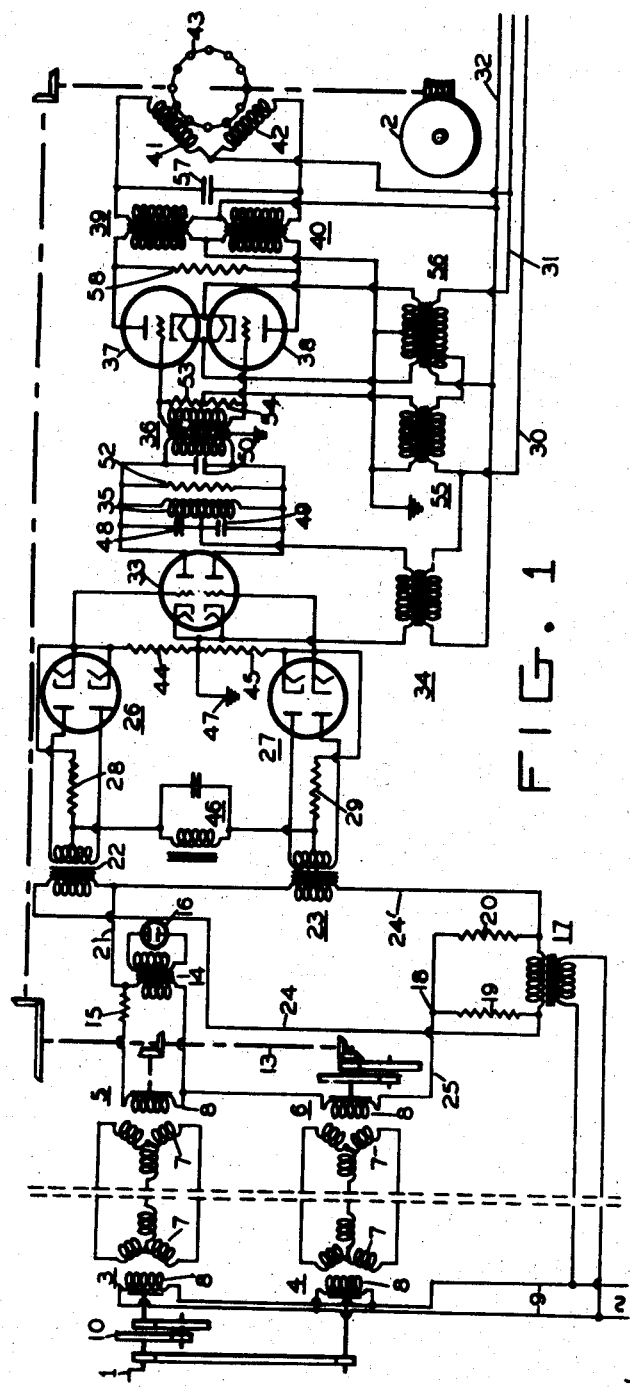
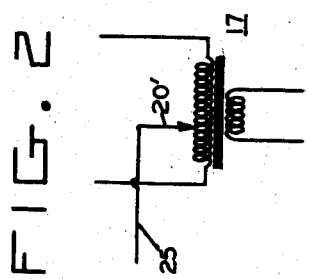

2,424,569

UNITED STATES PATENT OFFICE 2,424,569

ELECTRIC MOTOR FOLLOW-UP SYSTEM

Francis L. Moseley, Chevy Chase, Md., Eric J. Isbister, Brooklyn, N. Y., and Hayes B. Steinhauser, Jersey City, N. J., assignors to Sperry Gyroscope Company, Inc., Brooklyn, N. Y., a corporation of New York Application March 6, 1941, Serial No. 382,020

11 Claims. (Cl. 172—239)

This invention relates, generally, to electrical control systems and the invention has reference, more particularly, to a novel remote electrical positional control system of the general type disclosed in the copending application of Isbister and Moseley, Serial No. 304,895, filed November 17, 1939, wherein a turnable controlling object is arranged to operate through suitable electrically operable means to cause a controlled object to turn in substantial synchronism with the controlling object, said electrically operable means employing a pair of signal voltage transmitters or synchronous generators operating in different speed ratios, i. e., a fine or high speed transmitter and a coarse or low speed transmitter, corresponding receivers being employed adjacent the controlled object and operating through novel servo mechanism for determining the motion of the controlled object.

In order to obtain great accuracy of reproduction by the controlled object, i. e., substantial synchronism of the objects, it is necessary to employ a fine or high speed signal voltage transmitter and connected receiver arrangement. This high speed arrangement may operate in a ratio, for example, of 36:1, providing one channel of the synchro-transmission system. The other channel of the transmission system is connected in a 1:1 ratio inasmuch as the objects may get out of step any amount from zero to 180° in either direction due, for example, to the turning of the controlling object, such as a handwheel, when the system is not energized.

The principal object of the present invention is to provide a novel positional control system employing high and low speed transmitter-receiver arrangements, a remote servo system controlled therefrom for operating a controlled object in synchronism with the low speed transmitter, the power supply for the transmitter-receiver arrangements being independent of that provided for the remote servo system, improved circuit means being provided for converting the output of the transmitter-receiver arrangements into a reversible phase, variable magnitude signal for use in controlling the servo system.

Another object of the present invention lies in the provision of a remote positional control system wherein means are provided for isolating ground currents for preventing these currents from circulating in a manner which would tend to change the bias of the tubes employed in the servo system.

Still another object of the present invention is to provide simplified means for eliminating 180° ambiguity of the controlled object with respect to the operation of the transmitter equipment, i. e., simplified means being provided for preventing the controlled object from coming to rest 180° out of phase with the controlling object.

Still another object of the present invention is to provide a remote positional control system having improved means for producing not only a displacement signal, but also rate signals, i. e., velocity and acceleration, for use in conjunction with the displacement signal to effect anti-hunt control of the servo system and controlled object.

Other objects and advantages will become apparent from the specification, taken in connection with the accompanying drawings wherein the invention is embodied in physical form.

In the drawings,

Fig. 1 is a wiring diagram illustrating one form of the novel positional control system of this invention.

Fig. 2 illustrates a portion of the circuit of Fig. 1, somewhat modified.

Similar characters of reference are used in all of the above figures to indicate corresponding parts.

Figure 3:
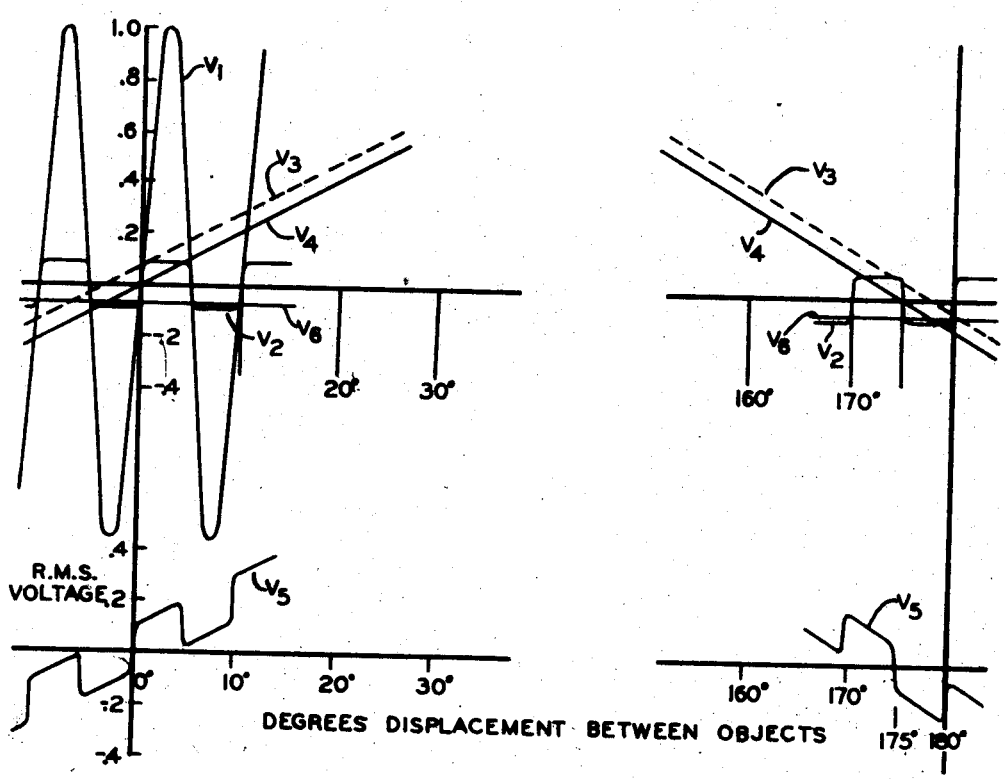
Fig. 3 is a diagram illustrating the potentials involved in the output of the transmitter-receiver circuits of Fig. 1.

Referring now to Fig. 1 of the drawings, the controlling object 1 is illustrated as a handwheel, although the same might be any small power-turned object such as a telescope, the angular position of which is to be accurately and immediately repeated by a controlled object 2, which may be a ponderable turnable object. The high and low speed transmitting devices 3 and 4 and their remote connected receiving devices 5 and 6, constituting a synchronizing circuit, may be of any suitable type. Preferably, these devices are of the A. C. type in which the transmitting and receiving devices are similar in construction and are each provided with a poly-circuit armature winding 7 physically similar to a three-phase star-connected armature winding. This armature winding may be mounted on the stator, while the field winding 8 is on the rotor. In connecting each receiving device to its respective transmitting device, three conductors are used by means of which like points of the two armature windings 7 of the devices are interconnected. The field windings 8 of the transmitters are connected to a suitable source of A. C. supply fed through the single phase leads 9, which may be supplied from a local source, if desired. Field winding 8 of the high speed transmitter 3 is connected to handwheel 1 through step-up gearing 10, whereas field winding 8 of the low speed transmitter 4 is connected to turn at the same rate as the handwheel 1.

Transmitter field windings 8 produce in their respective armature windings 7, alternating magnetic fields having positions in space determined by the relative positions of windings 7 with respect to windings 8. Any rotation of the transmitter field windings or rotors 8 caused by angular movement of the handwheel produces a corresponding angular shifting of the axes of the magnetic fields of their respective armature windings, resulting in a corresponding shifting of the fields of the armature windings 7 of the receivers 5 and 6, thereby tending to cause field windings 8 of the receivers to follow up such shift, but since these field windings are mechanically connected by the mechanical follow-up transmission 13 to the controlled object 2, alternating E. M. F.'s are induced in the field windings 8 of receivers 5 and 6, the values of which E. M. F.'s are substantially proportional to the angular displacement between the handwheel 1 and object 2, i. e., for small angular displacements, and the phase of which E. M. F.'s reverse with a reversal in the direction of turning of the handwheel.

The A. C. signal voltage induced in field winding 8 of the high speed or fine receiver 5 is applied across the primary of a transformer 14 having a resistor 15 in series therewith. The secondary of transformer 14 is connected to excite a neon tube 16, whereby the latter serves to limit the effective voltage output of the high speed receiver. The thusly limited voltage of the high speed or fine receiver 5 is added in series with the signal voltage output of the low speed or coarse receiver 6 and with a fixed anti-stick-off voltage supplied from the secondary of a transformer 17 that has its primary excited from the supply 9. This fixed voltage exists between the center of the secondary winding of transformer 17 and the common connection point 18 of two resistors 19 and 20 connected to the ends of the secondary of transformer 17 and by lead 25 to the rotor 8 of the low speed receiver 6. The summation voltage consisting of the limited fine receiver voltage, the low speed receiver voltage and the fixed antistick-off voltage connected in series, is supplied by a lead 21 to unlike ends of the primaries of input transformers 22 and 23, the circuit being completed via leads 24 and 24'.

The transformer 17 also supplies an A. C. reference voltage or signal through leads 24 and 24' passing in series through the primaries of transformers 22 and 23. The secondardies of transformers 22 and 23 are connected to full wave rectifiers 26 and 27, respectively, having output resistors 28 and 29. The full wave rectifiers or double modulators 26 and 27 act as an isolation circuit in that they serve to separate the alternating current of the synchro-transmission system from the alternating current supply of the servo circuit. This enables the signal system fed from A. C. supply leads 9 to be supplied from a power source which is not necessarily interlocked with the power source 30, 31, 32 supplying the servo end of the system. The D. C. outputs of the full wave rectifiers or double modulators 26 and 27 are supplied to a double triode vacuum tube 33 serving as a modulator and amplifier. The plate cathode circuit of tube 33 is supplied from a transformer 34 energized from leads 30 and 32 of the three phase leads 30, 31, 32. Plate current from transformer 34 divides in a center tapped choke 35 passing to the plates of tube 33. Choke 35, cooperating with tube 33 and a rate taking transformer 36, serves to produce a reversible phase, variable magnitude signal comprising not only displacement but also rate terms, as will further appear, which signal is fed to the grids of grid controlled rectifiers 37 and 38 having output transformers 39 and 40, the secondaries of which are connected respectively to the two stator windings 41 and 42 of the two-phase induction motor 43 driving the controlled object 2.

The operation of the system of the present invention will be better understood by referring to the diagram of Fig. 3. The voltages shown in this figure are the R. M. S. (meter) values of the various voltages and are plotted against the angular position of the controlled object with respect to the controlling object. Voltages plotted below the horizontal or X axis are to be understood to be 180° out of time phase with those plotted above this axis. If the summation voltage reverses its time phase, the controlled object reverses its direction of rotation. Curve $V_1$ shows the open circuit voltage across the receiver rotor 8 of the 36:1 transmitter-receiver device. It will be seen that this voltage has a zero every five degrees. The phase relations are such, however, that so far as this voltage alone is concerned, the controlled object will synchronize only at the even zero points, i. e., at 0°, 10°, 20°.

Curve $V_2$ shows the open circuit voltage of the 36:1 receiver rotor 8 as limited by the action of the neon tube 16. This is the voltage that appears across the primary of transformer 14. Neon tube 16 appears as an open circuit across the secondary of transformer 14 until the ignition voltage of this tube is reached, and as the open circuit primary impedance of transformer 14 is high, substantially the open circuit output of the 36:1 Selsyn appears across this point, but when the tube fires, it practically short-circuits the secondary of transformer 14 and this low impedance is reflected to the primary and, in conjunction with resistance 15, prevents the signal from increasing any further. It can be seen that the limited signal rises from zero with the same slope as the unlimited signal and is then sharply cut off, as shown in curve $V_2$, at a low value. The ratio of transformer 14 must be such that the peak value of the limited signal is always less than the value of the 1:1 signal at ±5° from zero.

Curve $V_3$ shows the open circuit voltage of the 1:1 transmitter-receiver device. This curve has only two zero points per revolution of the controlled object, and the phase relations are such that the object is always driven to the 0° point.

If the limited 36:1 signal and the 1:1 signal were added together and applied to the control of the object 2, then we would have only two synchronous points, namely, zero and 180°. It will be seen from the phase relations of the 36:1 signal that it tends to hold the controlled object at the 180° point as well as at the 0° point, and if the controlled object should come within a few degrees (2.5) of the 180°, it would overpower the 1:1 signal and keep the object at the 180° point of sychronization. This 180° ambiguity is eliminated, however, by the addition of the fixed A. C. voltage $V_6$ supplied through the secondary of transformer 17, which voltage may be termed an anti-stick-off voltage. This fixed additional voltage $V_6$ gives the 1:1 signal voltage a zero at 0° and at 175°, as shown by curve $V_4$, and adds in the proper phase relation with the limited 36:1 signal to give only one point of synchronization for the controlled object, namely, the 0° point. The zero signal point at 175°, shown by curve V₅ of Fig. 3, is an unstable zero and our attempt to hold the controlled object at this point is like trying to balance a needle on its point, which is practically impossible since the controlled object tends to move from this point and in a direction dependent upon the resultant voltage.

If the sum of the fixed or anti-stick-off voltage plus the limited 36:1 and the 1:1 voltage is equal to zero, then the reference voltage or signal supplied from the secondary of transformer 17 will cause equal currents to flow through the primaries of transformers 22 and 23, this current flowing by way of leads 24 and 24'. This will cause equal D. C. voltages to appear across the output resistors 28 and 29 of the rectifiers 26 and 27. As connected, these equal D. C. voltages will balance to zero across input resistors 44 and 45 of tube 33 so that there will be no net voltage across the grids of triode 33.

If, however, the combined Selsyn and anti-stick-off voltage, i. e., curve V₅ in Fig. 3, is not zero, it will add to the reference voltage of transformer 17 in such a way that it will either increase the current flowing through the primary of transformer 22 and decrease that through the primary of transformer 23, or vice versa, depending upon the direction in which the handwheel 1 is turned. Thus, assuming for the moment that the reference voltage is flowing up through lead 24 and down through the primaries of transformers 22 and 23, then since the combined signal voltage flows in opposite directions through the primaries of transformers 22 and 23, it will be additive in one transformer and subtractive in the other with respect to the reference voltage or signal. Thus, assuming that lead 21 is positive at the time lead 24 is positive, then the combined signal voltage will oppose the reference voltage in the primary of transformer 22 and will add with the reference voltage in the primary of transformer 23 so that there will result unequal D. C. voltages across output resistors 28 and 29 of rectifier tubes 26 and 27 and a net D. C. signal voltage will appear across the grids of the vacuum tube 33, the polarity of which voltage will reverse with a reversal in direction of turning the handwheel 1. The tuned circuit 46 serves to filter the output of the rectifiers 26 and 27. This tuned circuit is preferably tuned to the double frequency output of the rectifiers. The resistors 44 and 45 provide a center tap connected to the filaments of tube 33 to provide a grid return. This center tap is grounded, as shown at 47, for purposes which will be further explained.

The vacuum tube 33 serves as a modulator and amplifier and is shown as supplied from the transformer 34, preferably with 60-cycle A. C. for its plate voltage. The plates of this tube are connected in parallel so far as this supply is concerned, whereby the tube is operative only during half of each cycle. If there is no signal upon the grids of this tube, equal but opposite half wave rectified plate currents flow through each half of the choke 35. Assuming that a relative displacement takes place between the objects 1 and 2 so as to make the polarity of the D. C. grid signal such that the upper grid of this tube 33, for example, is positive with respect to the lower grid thereof, more current will flow through the upper half of choke 35 than will flow through the lower half thereof. This unbalanced current will make the upper end of choke 35 negative with respect to its lower end. If the polarity of the D. C. voltage on the grids of tube 33 should be reversed due to reversal of the direction of rotation of handwheel 1, then in that case the lower end of choke 35 becomes more negative than its upper end. As this current is pulsating D. C., the condensers 48 and 49, connected in series across choke 35, serve to convert this current into a fair wave form A. C. with a steady D. C. component. The amplitude of the A. C. component is substantially proportional to the combined D. C. signal supplied on the grids of tube 33. This A. C. component, corresponding to the displacement signal, passes through transformer 36 and its associated circuits to the grids of the grid controlled rectifiers 37 and 38. In other words, this A. C. signal supplied upon the grids of tubes 37 and 38 is substantially proportional to the relative displacement between the controlled object 2 and the controlling object 1.

If the signal on the grids of vacuum tube 33 is constant, corresponding to a fixed relative displacement, the net D. C. component of the plate current across choke 35 is constant and does not pass through transformer 36. If, however, the displacement signal is changing, causing the D. C. signal on the grids of tube 33 to be changing, the D. C. plate current across choke 35 correspondingly changes. The voltage across the D. C. resistance of choke 35 is proportional to the current through it and, therefore, to the displacement between the controlled object and the controlling object. The voltage induced across the inductance of choke 35, however, is proportional to the rate of change of current through it, i. e., to the rate of change of displacement, which is velocity. These two D. C. components, corresponding to displacement and the first derivative thereof, are fed to the primary of transformer 36 and if these two voltages are changing, the primary inductance of the transformer takes derivatives of these components so that voltages appear across the secondary of this transformer that are substantially proportional to the first and second derivatives of the displacement with respect to time, i. e., to the relative velocity and acceleration between the objects. If the relative displacement of the objects is not changing, neither of these voltages will be present, and if the relative displacement is changing uniformly, only one, the first derivative of displacement with respect to time, will appear, but if the relative displacement of the objects is changing with acceleration or deceleration, both voltages will appear. Thus, the tubes 37 and 38 are controlled not only with a displacement signal but also with a velocity and acceleration signal where these terms obtain, as where the handwheel 1 is being moved with acceleration. The use of these three terms, namely, displacement, velocity and acceleration, serves to prevent hunting of the motor 43, and hence of the controlled object.

Condensers 48 and 49 and also condenser 50, this last condenser being connected across the primary of transformer 36, in addition to improving the wave form of the A. C. component of the signal, act by reducing this A. C. or displacement component somewhat to relatively increase the rate D. C. surge components, which is desirable in obtaining a dead beat control. Resistors 52, 53, 54 serve a similar purpose in that they tend to attenuate the A. C. displacement signal while enhancing the rate signals. The resistors 53 and 54 also supply a low impedance path for the high frequency currents generated during the operation of grid glow tubes 37 and 38. The tubes 37 and 38 are controlled by the resultant signal voltage appearing across the secondary of transformer 36, which acts to shift the phase of the net signal from the grid to cathode. This is accomplished by feeding the grid of tube 37 with the component of the signal voltage across resistor 53 taken in series with an A. C. bias voltage supplied from a transformer 55 energized from three-phase leads 30, 31 and 32. Also, the grid of tube 38 is fed with that portion of the resultant signal voltage across resistor 54 added in series with the A. C. bias voltage from the secondary of transformer 55.

The combined signal voltage output of transformer 36 is maintained in phase with the plate voltage supplied by transformer 55 to the plates of tubes 37 and 38. The A. C. bias voltage from the secondary of transformer 55 lags the plate voltage of tubes 37 and 38 by approximately 120°. As the signal voltage across resistor 53 increases with such phase relation that it adds to the A. C. bias voltage from transformer 55, the net signal on the grid of tube 37 advances in phase, causing the plate current of tube 37 to progressively increase. At the same time the voltage across resistor 54 is of such phase that it subtracts from the A. C. bias voltage supplied by transformer 55, so that the net signal voltage on the grid of tube 38 is retarded in phase, thereby progressively reducing the plate current of tube 38. When the phase of the signal voltage reverses, as when the handwheel 1 is turned in the reverse direction, the phase of the voltage on the grids of tubes 37 and 38 is shifted in opposite direction, resulting in an increase of the plate current of tube 38 and a reduction of the plate current of tube 37.

The plate currents serve, in effect, to short the secondaries of transformers 39 and 40 in a manner similar to that described in connection with the above mentioned application Ser. No. 304,895. Thus, when tube 37 is passing current, transformer 39 is shorted in effect, so that winding 41 of motor 43 takes a current that is in phase with that of leads 31 and 32, whereas the current passing through winding 42 will be leading, since this current flows through the condenser 57, causing motor 43 to operate in one direction. On the other hand, when tube 38 is passing current, transformer 40 is shorted in effect, so that winding 42 takes the current in phase with leads 31 and 32 and winding 41 takes a leading current which flows through condenser 57, causing motor 43 to turn in the opposite direction. Since the change in the impedances of transformers 39 and 40 is substantially proportional to the signal voltage, the speed of the motor is controlled substantially proportionally to the signal voltage. Resistor 58 serves to absorb some of the transients that occur when tubes 37 and 38 are firing.

The transformer 36, in addition to acting as a differentiator, serves also to prevent ground currents from circulating and altering the bias of grid controlled rectifier tubes 37 and 38. The core of this transformer is shown grounded so as to reduce the capacity coupling between its windings to as low a value as practicable. The cores of the other transformers are preferably grounded also. In the circuit of the above mentioned application Ser. No. 304,895, capacity coupling was used between the tube corresponding to tube 33 and the grid circuits of the connected grid glow tubes. In that case, the cathode of the tube corresponding to tube 33 was not grounded, so that a small A. C. current was thus allowed to flow from the plate circuit of the tube corresponding to tube 33, through the capacity coupling to the grid circuits of the thyratron tubes, and thence across their input resistors through the bias voltage supply transformer to ground, and then through the capacity to ground of the plate supply transformer of the tube corresponding to tube 33 back to the plate supply of said tube. This current was caused to flow by the high plate voltage from the transformer supplying the amplifier-modulator tube corresponding to tube 33, and which current, acting across the input resistors of the grid glow tubes, produced a voltage drop, thereby changing the bias of these tubes and causing improper operation. Any change in the bias condition of these tubes results in change in sensitivity of the amplifier and will cause it to be very insensitive, or vice versa. These capacitative changes are functions of temperature and time and are eliminated in the present circuit since the transformer 36 effectively blocks such circulating currents from reaching the tubes 37 and 38, and since any capacitive circulating current from transformer 34 will pass through transformer 36 to ground and by way of ground 47 directly back to transformer 34.

Instead of employing the two resistors 19 and 20 connected with the ends of the secondary of transformer 17 and connected together at point 18 for supplying the anti-stick-off voltage, a tap 20' may be provided on the secondary of transformer 17, as shown on Fig. 2 of the drawings, this tap being connected to lead 25.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a remote positional control system, a plurality of objects arranged to move in synchronism, synchronizing means interconnecting said objects, said synchronizing means comprising a synchronizing circuit including transmitter and repeater means for setting up an alternating reversible phase potential signal responsive to the departure of the objects from synchronism, an alternating current supply for said synchronizing circuit, an isolation circuit including modulating means fed from said synchronizing circuit for converting the alternating reversible phase potential signal output thereof into a reversible direct current potential signal, a second source of alternating current supply, thermionic tube means fed from said second source and connected for receiving said reversible direct current signal and for converting the same into a composite signal including a reversible phase alternating current signal component and a D. C. surge signal component, a servo motor mechanism including a motor for driving said controlled object, said thermionic tube means including means for receiving said composite signal and for controlling said motor, and a follow-up connection from said servo motor mechanism to said synchronizing circuit.

2. In a positional follow-up control wherein a reversible motor drives a system into angular correspondence with a synchro transmitter means, synchro transmitter means, a driven system, driving means for said system including a reversible motor, receiver means connected to said transmitter means for producing a reversible phase alternating voltage signal in accordance with relative displacement between said two interconnected means, a follow-up connection between said motor and said receiving means in part controlling said relative displacement, means for producing an alternating reference voltage for combination with said reversible signal, dual modulating means connected for receiving the combined reversible signal voltage and the reference voltage, one of said modulating means receiving these voltages in additive relation while the other of said modulating means receives these voltages in subtractive relation, said dual modulating means serving to convert these combined voltages into a reversible polarity direct current signal, and thermionic means connected for receiving said direct current signal including means for controlling the speed and direction of rotation of said reversible motor in accordance therewith.

3. In a positional control system of the character described, a plurality of objects arranged to move in synchronism, synchronizing means interconnecting said objects including a reversible motor for maintaining said objects in synchronism, said synchronizing means also including high speed and low speed transmitter and connected receiver arrangements for setting up alternating potentials corresponding to the departure of said objects from synchronism, means for limiting the maximum potential output of said high speed transmitter-receiver arrangement, means for supplying an alternating potential signal of substantially constant value, means for combining said three signals, means for supplying an additional alternating reference signal for combination with said other signals, and means for impressing the resultant upon a thermionic tube circuit, the output of which controls the speed and direction of rotation of said reversible motor.

4. A positional control system of the character described comprising a plurality of objects arranged to move in synchronism, synchronizing means interconnecting said objects, said synchronizing means including high speed and low speed transmitter and connected receiver arrangements for setting up alternating variable signal potentials responsive to the departure of said objects from synchronism, transformer means for supplying a fixed alternating potential, means connecting said fixed alternating potential in series with said variable signal potentials, thermionic rectifier means, said transformer means also supplying an additional alternating reference potential for combination with said other potentials for application to said thermionic rectifier means to produce a reversible direct current potential, thermionic tube means for receiving said reversible direct current potential and for reconverting the same into an alternating current potential, motive means controlled from said thermionic tube means for causing said objects to return to synchronism, and a follow-up connection between said motive means and said high and low speed receiver arrangements.

5. In a positional control system, the combination of controlling and controlled objects, a motor for driving said controlled object, thermionic tube means for controlling said motor, high speed and low speed transmitters operated from said controlling object, high speed and low speed receivers electrically connected to said transmitters, said receivers being arranged to be electrically connected to said thermionic tube means to supply signal voltages thereto, voltage limiting means connected to the output of at least one of said receivers for limiting the signal voltage of the latter, means for supplying an alternating voltage in series with the output of said receivers to be applied to said thermionic tube means, said added alternating voltage serving to eliminate 180 degree ambiguity of said controlling and controlled objects, said last named means also serving to supply another alternating voltage serving as a reference voltage for use in detecting the phase of said signal voltages, and a mechanical follow-up connection between said controlled object and said high and low speed receivers.

6. In a remote control system, a transmitter-receiver arrangement for producing a reversible phase alternating current signal, means for producing an alternating reference voltage, dual full wave rectifiers, said alternating current signal being additive to said reference voltage for application to one of said rectifiers and being subtractive from said reference voltage for application to the other of said rectifiers, a push-pull amplifier having its grids connected to the outputs of said respective amplifiers, means for supplying alternating potential to the plate-cathode circuit of said amplifier whereby said amplifier has an A. C. output responsive to the differential output of said rectifiers, a pair of grid glow tubes arranged in push-pull to receive the output of said amplifier, transformers connected in the output of said grid glow tubes, and an induction motor having windings connected to said transformers whereby the speed and direction of said motor is determined by the outputs of said grid glow tubes.

7. In a positional control system, a transmitter-receiver arrangement for producing a reversible phase alternating current signal, means for producing an alternating reference voltage, and dual full wave rectifiers, said alternating current signal being additive to said reference voltage for application to one of said rectifiers and being subtractive from said reference voltage for application to the other of said rectifiers, a push-pull amplifier having its grids connected to the outputs of said respective rectifiers, means for supplying alternating potential to the plate-cathode circuit of said amplifier whereby said amplifier has an A. C. output responsive to the differential output of said rectifiers, said amplifier having impedance means in its plate circuits for producing surge potentials corresponding either to the displacement signal or a time derivative thereof, transformer means connected for receiving said alternating and surge voltages and for taking time derivatives of the latter, dual grid glow tubes fed from said transformer means, motive means driving the controlled object controlled from the output of said dual grid glow tubes, and a follow-up connection from said motive means to said transmitter-receiver arrangement.

8. A positional follow-up control system wherein a reversible motor drives the system into angular correspondence with a synchro transmitter, transmitter means, a driven system, a reversible motor for driving said system, means for producing a reversible alternating signal from the relative displacement between the transmitter means and the driven system, means for producing a fixed alternating current signal, means for combining said two signals, means for producing an alternating reference signal, modulator means supplied with a version of said combined signals and said reference signal and acting to convert the same into a direct current signal, a second modulator for reconverting said direct current signal into a resultant alternating current signal, a thermionic tube circuit, means for impressing the resultant alternating current signal upon said thermionic tube circuit, the output of which controls the direction and speed of rotation of said reversible power motor, and a follow-up connection between said motor and said transmitter means.

9. In a positional control system of the character described, a high speed and a low speed transmitter-receiver arrangement, means for limiting the voltage output of said high speed transmitter-receiver arrangement, transformer means for supplying an anti-stick-off voltage in series with the voltage outputs of said transmitter-receiver arrangements and for supplying a reference voltage to be combined with said transmitter-receiver and reference voltages, a modulator for receiving said combined voltages and for converting the same into a reversible D. C. signal, a second modulator for reconverting said reversible D. C. signal into an alternating reversible phase signal, grid controlled rectifier means, transformer means receiving the output of said second modulator for applying the alternating current signal and one or more time derivative signals to said grid controlled rectifier means, a reversible motor connected to be operated from the outputs of said grid controlled rectifier means, a controlled object driven from said motor, and a follow-up connection between said motor and a member of said transmitter-receiver arrangement whose position affects the output voltage thereof.

10. In a positional control system of the character described, controlling and controlled objects, transmitter-receiver means for producing a variable alternating potential signal responsive to the relative displacement of said objects, said signal reversing in phase with reversal of the direction of relative displacement of said objects, dual transformer and connected rectifier means, means for supplying a reference voltage to said dual transformer means, said signal potential being additive to said reference voltage in one of said transformer means and subtractive in the other, depending upon the direction of such relative displacement of the objects, said rectifier means converting said signal voltage into a direct current signal potential of reversible polarity also depending on the direction of the relative displacement of said objects, a combined amplifier and modulator for amplifying said signal potential and for reconverting the same into a reversible phase alternating potential, means including a transformer in the output circuit of said amplifier-modulator for producing a time derivative potential of said displacement potential for combination with the latter, grid controlled rectifier means connected for receiving said potentials, motive means controlled from said rectifier means and connected for driving said controlled object, and a follow-back connection between said motive means and said transmitter-receiver means.

11. A positional control system as defined in claim 10, wherein said combined amplifier-modulator and its output circuit transformer are provided with means for by-passing circulating capacity currents to thereby prevent such currents from adversely affecting said grid controlled rectifier means and hence the sensitivity of the system.

FRANCIS L. MOSELEY.
ERIC J. ISBISTER.
HAYES B. STEINHAUSER.

REFERENCES CITED

The following references are of record in the file of this patent:

UNITED STATES PATENTS

| Number | Name | Date |
| --- | --- | --- |
| 1,977,624 | Davis | Oct. 23, 1934 |